US006973218B2

(12) United States Patent
Alderson et al.

(10) Patent No.: US 6,973,218 B2
(45) Date of Patent: Dec. 6, 2005

(54) DYNAMIC RANGE COMPRESSION

(75) Inventors: Timothy Alderson, Winter Spring, FL (US); Gene D. Tener, Oviedo, FL (US); Valete C. Hopkins, Winter Spring, FL (US); Charlie W. Stuart, Orlando, FL (US); Chinh X. Nguyen, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 723 days.

(21) Appl. No.: 09/841,081

(22) Filed: Apr. 25, 2001

(65) Prior Publication Data

US 2002/0159648 A1 Oct. 31, 2002

(51) Int. Cl.[7] .............................................. G06K 9/40
(52) U.S. Cl. ..................................... 382/260; 382/262
(58) Field of Search ................................ 382/260, 262, 382/254, 232, 299, 298, 264, 266; 348/606–624; 358/447, 461, 463

(56) References Cited

U.S. PATENT DOCUMENTS

| | | | |
|---|---|---|---|
| 5,341,442 A | * | 8/1994 | Barrett ........................ 382/166 |
| 5,382,977 A | | 1/1995 | Kozlowski et al. |
| 5,391,873 A | | 2/1995 | Cuthbertson |
| 5,446,378 A | | 8/1995 | Reich et al. |
| 5,455,622 A | | 10/1995 | Compton |
| 5,563,405 A | | 10/1996 | Woolaway, II et al. |
| 5,589,928 A | | 12/1996 | Babbitt et al. |
| 5,629,988 A | | 5/1997 | Burt et al. |
| 5,631,466 A | | 5/1997 | Botti et al. |
| 5,648,649 A | | 7/1997 | Bridgelall et al. |
| 5,657,402 A | | 8/1997 | Bender et al. |
| 5,693,940 A | | 12/1997 | Botti et al. |
| 5,717,208 A | | 2/1998 | Woolaway, II |
| 5,721,427 A | | 2/1998 | White et al. |
| 5,801,678 A | | 9/1998 | Huang et al. |
| 5,872,628 A | | 2/1999 | Erskine |
| 5,903,659 A | | 5/1999 | Kilgore |
| 5,925,875 A | | 7/1999 | Frey |
| 5,925,880 A | | 7/1999 | Young et al. |
| 5,925,883 A | | 7/1999 | Woolaway, II |
| 5,949,919 A | * | 9/1999 | Chen .......................... 382/276 |
| 5,963,675 A | | 10/1999 | van der Wal et al. |

(Continued)

FOREIGN PATENT DOCUMENTS

EP          0 653 882 A1      5/1995

(Continued)

OTHER PUBLICATIONS

Erik Meijering, "TransformJ: A Java Package for Geometrical Image Transformation," "TransformJ: Affine," 5 pages, retrieved from the Internet on Apr. 15, 2004, http://imagescience.bigr.nl/meijering/software/transformj/index.html and http://imagescience.bigr.nl/meijering/software/transformj/affine.html.

*Primary Examiner*—Yon J. Couso
(74) *Attorney, Agent, or Firm*—Buchanan Ingersoll

(57) ABSTRACT

A method and apparatus for processing image data is described, comprising acquiring a frame of image data and compressing the dynamic range of the frame of image data using a dynamic range compression (DRC) algorithm that utilizes down-sampling, median filtering, and up-sampling. The DRC algorithm comprises down-sampling a frame of image data comprising a first array of pixels to generate a second array of pixels, applying a first median filter to the second array of pixels to generate a blurred array of pixels, up-sampling the blurred array of pixels, and removing at least a portion of low-frequency gradient data generated by previous steps from the frame of image data.

52 Claims, 11 Drawing Sheets

U.S. PATENT DOCUMENTS

| | | | |
|---|---|---|---|
| 6,011,625 A | 1/2000 | Glass | |
| 6,018,162 A | 1/2000 | Herbst et al. | |
| 6,020,842 A | 2/2000 | Lewis et al. | |
| 6,040,568 A | 3/2000 | Caulfield et al. | |
| 6,040,570 A | 3/2000 | Levine et al. | |
| 6,046,695 A | 4/2000 | Poehler et al. | |
| 6,047,028 A | 4/2000 | Van Ackere et al. | |
| 6,198,768 B1 * | 3/2001 | Yamaguchi et al. | 375/240.01 |
| 6,205,259 B1 | 3/2001 | Komiya et al. | |
| 6,269,175 B1 | 7/2001 | Hanna et al. | |
| 6,269,195 B1 * | 7/2001 | Gonsalves et al. | 382/284 |
| 6,336,082 B1 | 1/2002 | Nguyen et al. | |
| 6,359,681 B1 | 3/2002 | Housand et al. | |
| 6,477,279 B2 * | 11/2002 | Go | 382/240 |
| 6,556,704 B1 | 4/2003 | Chen | |
| 6,630,674 B2 | 10/2003 | Knauth et al. | |
| 6,654,504 B2 * | 11/2003 | Lubin et al. | 382/254 |
| 2002/0159101 A1 | 10/2002 | Alderson et al. | |
| 2002/0159651 A1 | 10/2002 | Tener et al. | |

FOREIGN PATENT DOCUMENTS

| | | |
|---|---|---|
| EP | 0 830 013 A2 | 3/1998 |
| WO | WO 97/01926 | 1/1997 |

* cited by examiner

| -.1 | -.1 | -.1 |
|---|---|---|
| -.1 | .9 | -.1 |
| -.1 | -.1 | -.1 |

FIG. 6A

| -.06 | -.06 | -.06 | -.06 | -.06 |
|---|---|---|---|---|
| -.06 | -.06 | .94 | -.06 | -.06 |
| -.06 | -.06 | -.06 | -.06 | -.06 |

FIG. 6B

| .006 | .012 | .018 | .018 | .018 | .012 | .006 |
|---|---|---|---|---|---|---|
| .012 | -.036 | -.124 | -.124 | -.124 | -.036 | .012 |
| .018 | -.024 | -.106 | .894 | -.106 | -.024 | .018 |
| .012 | -.036 | -.124 | -.124 | -.124 | -.036 | .012 |
| .006 | .012 | .018 | .018 | .018 | .012 | .006 |

DYNAMIC RANGE COMPRESSION

CROSS REFERENCE TO RELATED APPLICATIONS

The present application is related to U.S. Patent Application "Extended Range Image Processing For Electro-Optical Systems", Ser. No. 09/841,079 and to U.S. Patent Application entitled "Scene-Based Non-Uniformity Correction For Detector Arrays", Ser. No. 09/840,920 both filed even date herewith, the contents of which are hereby incorporated herein by reference in their entirety.

BACKGROUND

1. Field of the Invention

The present invention relates to dynamic range compression (DRC) of imagery. An exemplary aspect of the present invention relates to DRC of infrared (IR) imagery and, in particular, to real-time DRC of IR imagery collected with a forward looking infrared (FLIR) camera system.

2. Background Information

Imagery collected with a large field of view imaging apparatus, such as a wide field of view (WFOV) forward looking infrared (FLIR) pilotage system, may contain low-frequency gradient data, such as ground-to-sky gradient data, that can dominate the dynamic range of the imagery. As a result, the present inventors have found that detailed scene information can be essentially hidden in a corresponding image displayed on a display device. For example, the ground-to-sky temperature gradient observed by a FLIR system can be 30–40° C., whereas neighboring objects on the ground may only exhibit only a 1–2° C. temperature difference. Accordingly, details corresponding to objects on the ground can be difficult or impossible to detect if the low-frequency background gradient is not removed.

Accordingly, it would be desirable to have a method and apparatus for compressing the dynamic range of imagery to remove low-frequency gradient data. It would further be desirable to have such a method and apparatus that can be applied to imagery in real time, for example, imagery collected with a FLIR camera system, such as a pilotage system, or that can be applied to imagery previously collected and stored in a memory, for example.

SUMMARY

In an exemplary aspect of the present invention, a method and apparatus for processing image data are provided. The method comprises the steps of acquiring a frame of image data and compressing a dynamic range of the frame of image data using a dynamic range compression (DRC) algorithm that utilizes down-sampling, median filtering, and up-sampling. The method can further comprise normalizing the frame of image data prior to the step of compressing the dynamic range and applying a dead-channel-replacement correction after the step of normalizing the frame of image data. The method can further comprise applying a scene-based non-uniformity correction after the step of applying the dead-channel-replacement correction and applying edge-enhancement after the step of compressing the dynamic range. The method can further comprise applying noise filtering after the step of applying edge-enhancement and displaying an image corresponding to the frame of image data after the step of applying noise filtering. The apparatus comprises an image-data source and a processor unit coupled to the image-data source, wherein the processor can be configured to carry out the above-noted steps.

In another exemplary aspect of the present invention, a method and apparatus for dynamic range compression of image data are provided. The method comprises the steps of down-sampling a frame of image data comprising a first array of pixels to generate a second array of pixels, applying a first median filter to the second array of pixels to generate a blurred array of pixels, up-sampling the blurred array of pixels, and removing at least a portion of low-frequency gradient data generated by previous steps from the frame of image data. In an exemplary aspect, the up-sampling can comprise applying bilinear interpolation. In addition, the first median filter can be a large-area median filter, which can be a sparse large-area median filter. The method can further comprise the steps of applying a second median filter after applying the first median filter, the second median filter having a smaller kernel than the first median filter, and applying a mean filter after applying the second the median filter. The method can further comprise smoothing output data from the mean filter. The apparatus comprises a processor unit coupled to an image-data source, wherein the processor unit can be configured to carry out the above-noted steps.

In another exemplary aspect of the present invention, a method and apparatus for approximating a gaussian-blur filter are provided. The method comprises applying a first box filter having a first kernel size to a group of pixels of a frame of image data and applying a second box filter having a second kernel size to the group of pixels, wherein the first kernel coefficients of the first box filter and second kernel coefficients of the second box filter are configured to approximate a resultant gaussian function. The second kernel size can be greater than or equal to the first kernel size. The first kernel size of the first box filter can be symmetric, and the second kernel size of the second box filter can be asymmetric. Alternatively, the first kernel size of the first box filter and the second kernel size of the second box filter can both be symmetric. The apparatus comprises a processor unit coupled to an image-data source wherein the processor unit can be configured to execute the above-noted steps.

BRIEF DESCRIPTION OF THE FIGURES

Other objects and advantages of the present invention will become apparent to those skilled in the art upon reading the following detailed description of exemplary embodiments, in conjunction with the accompanying drawings, wherein:

FIG. 6A is an illustration of an exemplary first edge filter that can be cascaded with a second edge filter to approximate a gaussian blur function for use in an edge enhancement algorithm according to an exemplary aspect of the present invention;

FIG. 6B is an illustration of an exemplary second edge filter that can be cascaded with the exemplary first edge filter of FIG. 6A to approximate a gaussian blur function for use in an edge-enhancement algorithm according to an exemplary aspect of the present invention; and FIG. 6C is an illustration of an approximate gaussian edge filter representing the functional equivalent of cascading the exemplary first and second edge filters illustrated in FIGS. 6A and 6B;

FIG. 13 is a graphical illustration of an exemplary approach for addressing edge effects when applying a vertical and horizontal finite impulse response (FIR) filter according to an aspect the present invention.

DETAILED DESCRIPTION

Various aspects of the invention will now be described in connection with a number of exemplary embodiments. To facilitate an understanding of the invention, many aspects of the invention are described in terms of actions to be performed by a processor unit, a processor, and/or one or more field programmable gate array (FPGA) devices. It will be recognized that in each of the embodiments, the various actions could be performed by elements of a computer system. Further, it will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier such as solid-state memory, magnetic disk, optical disk or modulated carrier wave (such as radio frequency, audio frequency or optical frequency modulated carrier waves) containing an appropriate set of computer instructions that would cause a processor to carry out the techniques described herein. Further, the invention can additionally be considered to be embodied within an appropriate set of computer instructions that can be downloaded via a network connection to cause a processor to carry out the techniques described herein. Thus, the various aspects of the invention can be embodied in many different forms, and all such forms are contemplated to be within the scope of the invention. For each of the various aspects of the invention, any such form of embodiment can be referred to herein as "logic configured to" perform a described action, or alternatively as "logic that" performs a described action.

Figure 1:
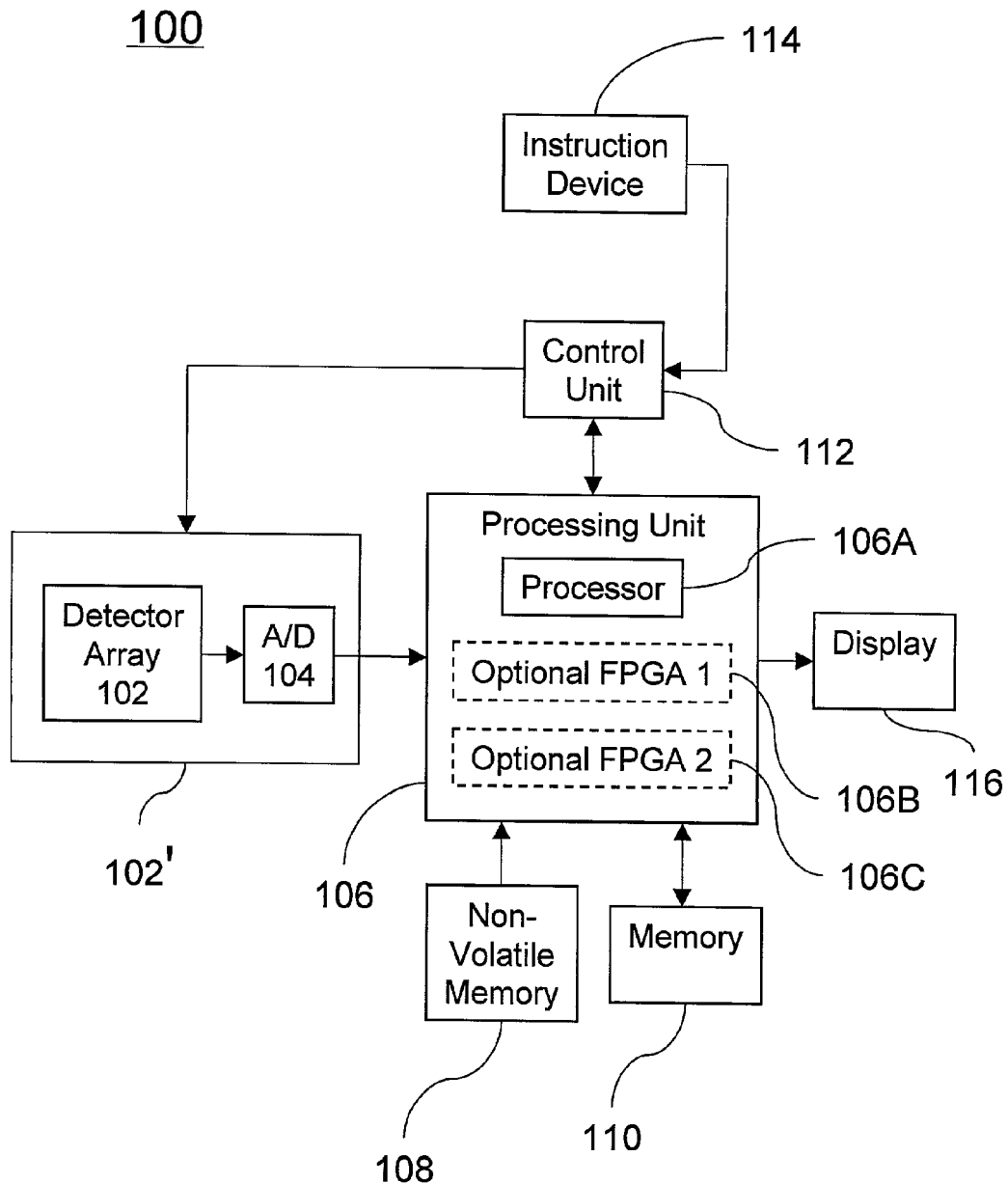
FIG. 1 is a block diagram illustrating an imaging apparatus in accordance with an exemplary aspect of the present invention.

FIG. 1 illustrates a block diagram of an apparatus 100 for gathering and processing imagery, such as infrared (IR) imagery, according to an exemplary aspect of the present invention. The apparatus 100 could, for example, be incorporated into a forward looking infrared (FLIR) camera system such as that described in commonly-assigned U.S. Pat. No. 6,359,681 entitled "Combined Laser/FLIR Optics System", the disclosure of which is hereby incorporated by reference in its entirety.

As illustrated in FIG. 1, the apparatus 100 comprises a image-data source 102', which can comprise, for example, a detector array 102 for collecting radiation, such as thermal radiation which can be IR radiation, and an analog-to-digital converter (A/D) 104 for converting analog imagery data into digital imagery data. Alternatively, the image-data source 102' can be a storage medium, such as a conventional memory, a magnetic disk, or an optical disk, in which frames of image data have been stored.

The detector array 102 can be a second generation scanning detector array comprising a plurality of detector channels known to those skilled in the art, and can be configured to collect data corresponding to two-dimensional imagery using appropriate optics (not shown), such as IR optics, and a scanning mechanism (not shown), such as a scanning mirror, also known to those skilled in the art. Additional information pertaining scanning detector arrays can be found, for example, in commonly assigned U.S. Patent Application entitled "Scene-Based Non-Uniformity Correction For Detector Arrays", Ser. No. 09/840,920, incorporated herein by reference as noted above. In addition, if the detector array 102 is a scanning detector array, the apparatus 100 can be configured for two samples per dwell, where dwell refers to the data acquisition time corresponding to a vertical column of image pixels (e.g., for a detector array configured as a column array of detector elements). In other words, the image data can be over-sampled two-to-one in a horizontal scanning direction. Implications of such over-sampling will be described below. In addition, it should be noted that use of the terms vertical and horizontal is merely for convenience and is not intended to be limiting in any way.

Alternatively, the detector array 102 can be a third generation two-dimensional focal plane array also known to those skilled in the art. The detector array 102, its supporting electronics and cooling mechanism (not shown), and the appropriate optics (not shown) can be mounted in a pod (not shown) that can be gimbal-mounted to an appropriate platform (e.g., an air vehicle) as known to those skilled in the art.

The apparatus 100 also comprises a processing unit 106, which, in turn, comprises a processor 106A and can comprise one or more optional field programmable gate array (FPGA) devices, such as devices 106B and 106C, for assisting with numerical computations. The processor 106A can be, for example, a high-performance Altivec microprocessor manufactured by Motorola. In addition, the utilization of FPGA devices to assist with numerical processing is known to those skilled in the art. The processing unit 106 processes imagery from the image-data source 102' as will be discussed in greater detail below.

The apparatus 100 can also comprise a non-volatile memory 108 and an additional memory 110. The non-volatile memory 108 can be utilized for storing initial values (e.g., factory-calibrated values) of correction coefficients for correcting imagery gathered by the scanning detector array as described in above-incorporated U.S. Patent Application entitled "Scene-Based Non-Uniformity Correction For Detector Arrays", Ser. No. 09/840,920. The additional memory 110 can be utilized, for example, for storing updated values of correction coefficients, such as gain and level coefficients, determined with a scene-based non-uniformity correction (SBNUC) routine, and can also be used for storing image data at various processing levels described below.

The apparatus 100 can also include a control unit 112 for controlling the detector array 102, the A/D converter 104, and the processing unit 106. In particular, the control unit 112 can control the gathering of successive frames of data by the detector array 102 as well as the A/D conversion of those frames of data and their subsequent processing by the processing unit 106. Moreover, the apparatus 100 can include an instruction device 114 that enables operation of the control unit. For example, the instruction device 114 could be a power control switch or a more complex device providing the ability to additionally adjust various parameters such as the dwell time of the detector array 102. In addition, the apparatus 100 can also comprise a display 116 for displaying imagery processed by the processing unit 106.

The detector array 102 can be any suitable detector known to those skilled in the art for gathering imagery of a desired wavelength. For example, the scanning detector array 102 can be a HgCdTe-based scanning detector array, a HgCdTe-based focal plane array, or other type of detector known to those skilled in the art.

The optional FPGA devices, 106B and 106C, illustrated in FIG. 1 can be any appropriate conventional FPGA device, such as the Virtex and Virtex-E series devices manufactured by Xilinx, Inc. (San Jose, Calif.). In the exemplary apparatus 100, it has been found to be advantageous to utilize two optional FPGA such as the Virtex series devices to provide dedicated numerical computation capability in conjunction with present generation processors. However, it will be readily apparent to those skilled in the art that as processor power continues to increase, it can become desirable to carry out all numerical computations within the processor 106A itself, thereby eliminating the FPGA devices 106B and 106C. Utilizing a processor 106A without the optional FPGA devices 106B and 106C can be beneficial from the standpoint of programming flexibility. Additional discussion pertaining to the FPGA devices 106B and 106C will be presented below.

It should be understood that variations in the configuration of the apparatus 100 can be utilized without departing from the teachings of the present invention. For example, the non-volatile memory 108 and the additional memory 110 could optionally be provided within the processing unit 106 itself. In addition, the control unit 112 and the processing unit 106 could be combined. Those skilled in the art will appreciate that the A/D convertor 104, the FPGA device 106B (including any of the individual functions of the disclosed FPGA device 106B), and any other desired functions can be embodied in individual components or in integral units.

Figure 2:
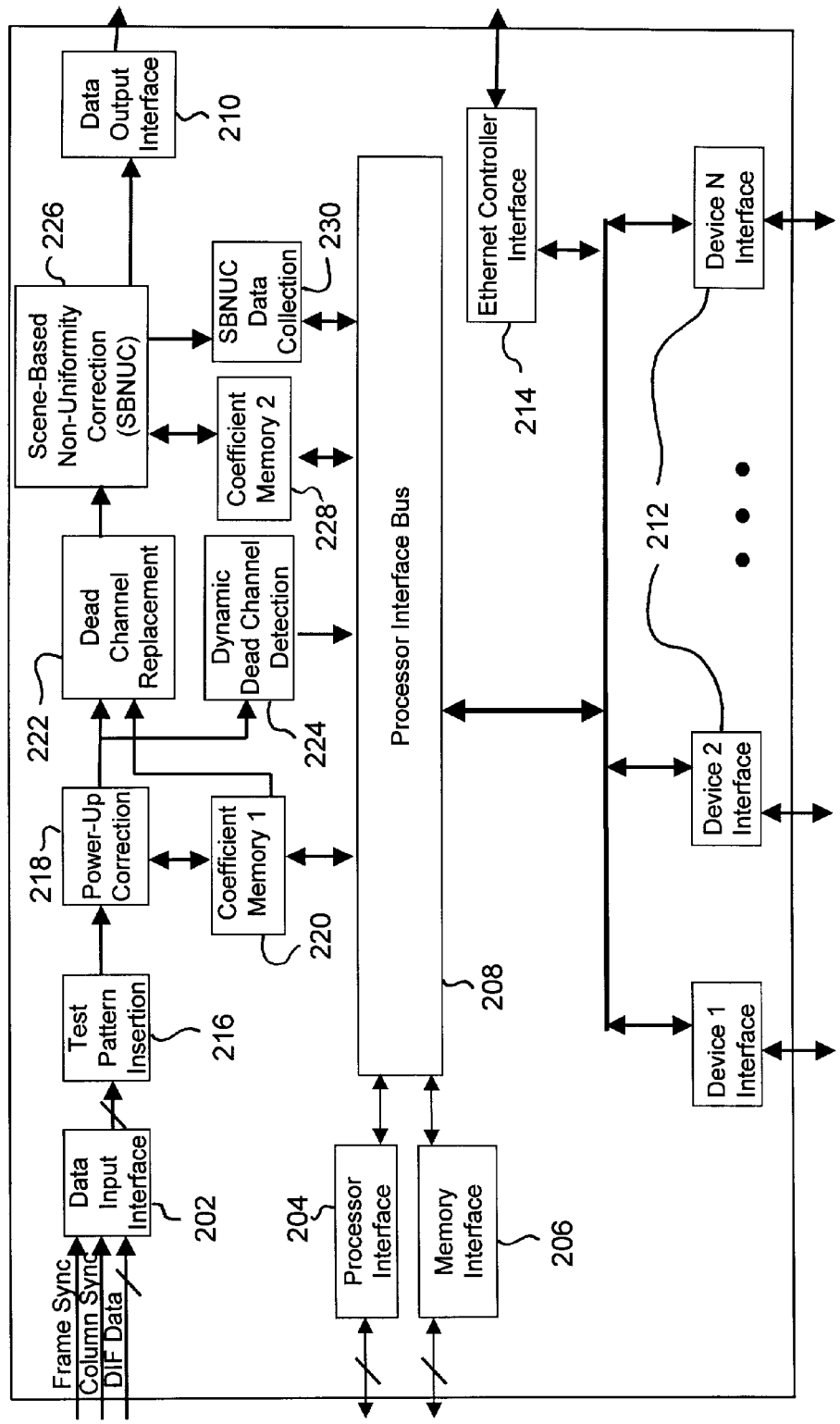
FIG. 2 is a block diagram illustrating functional aspects of an optional first field programmable gate array (FPGA) device that can be utilized in the present invention.
Figure 3:
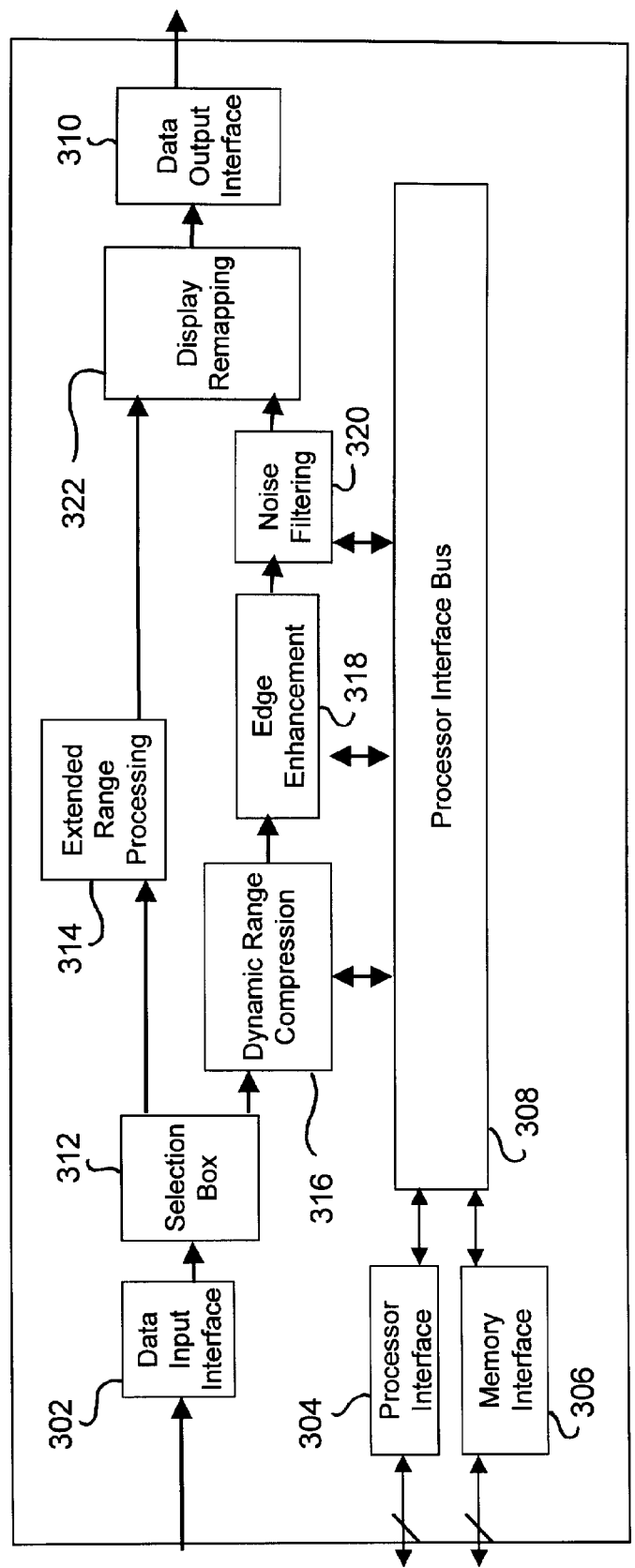
FIG. 3 is a block diagram illustrating functional aspects of an optional second field programmable gate array (FPGA) device that can be utilized in the present invention.

FIGS. 2 and 3 illustrate functional block diagrams of exemplary FPGA devices 200 and 300 that can be used according to exemplary aspects of the present invention. As shown in FIG. 2, FPGA 200 comprises a processor interface 204, a processor interface bus 208, a memory interface 206, a data input interface 202, and a data output interface 210, and can also comprise an Ethernet controller interface 214 for engineering purposes (e.g., testing) and one or more additional device interfaces 212 for communicating with and for processing data from other system devices. Moreover, with regard to functional aspects, it can be seen that FPGA 200 can carry out processing related to a power-up correction 218 (utilizing internal coefficient memory 1 220) and processing related to a SBNUC routine 226 (utilizing internal coefficient memory 2 228). In addition, the FPGA 200 can include a SBNUC data collection function 230, which can be a memory location for which both the processor 106A and the FPGA 200 (or 106B) can read and write data for SBNUC processing. An exemplary power-up correction and an exemplary SBNUC routine are disclosed in above-incorporated "Scene-Based Non-Uniformity Correction For Detector Arrays", Ser. No. 09/840,920. In addition, FPGA device 200 can carry out processing related to dead-channel detection 224 and replacement 222, as will be described below. The FPGA device can also carry out test pattern insertion 216 known to those skilled in the art for testing system electronics.

In addition, FPGA device 300 illustrated in FIG. 3 similarly comprises a processor interface 304, a processor interface bus 308, a memory interface 306, a data input interface 302, and a data output interface 310. With regard to functional aspects, it can be seen that FPGA device 300 can carry out processing related to extended range processing 314, such as that described in above-incorporated U.S. Patent Application "Extended Range Image Processing For Electro-Optical Systems", Ser. No. 09/841,079. Moreover, FPGA device 300 can also carry out processing related to DRC 316, edge enhancement 318, noise filtering 320, and display remapping 322 as described in greater detail below. It should be noted that FPGA device 300 can employ a selection box 312 for selectively carrying out processing related to extended range processing or dynamic range (and subsequent) processing. Display remapping refers to adjusting the bit resolution of data for display purposes, for example, converting 12-bit data utilized in computations to 8-bit data appropriate for displaying. Such display remapping is well known in the art and does not need to be described further.

Whereas FPGA devices can be utilized in the present invention, it should be noted that the use of such devices is not intended to be limited to the exemplary devices 200 and 300 illustrated in FIGS. 2 and 3, respectively. It will be understood, for example, that the noted functions could be allocated differently than that illustrated without departing from the spirit of the exemplary aspects illustrated in FIGS. 2 and 3.

As noted above, imagery collected with a large FOV imaging apparatus, such as a WFOV FLIR pilotage system, can contain low-frequency gradient data that can dominate the dynamic range of the imagery. Accordingly, exemplary aspects of the present invention directed at compressing the dynamic range of imagery to remove low-frequency gradient data will now be described.

Figure 4:
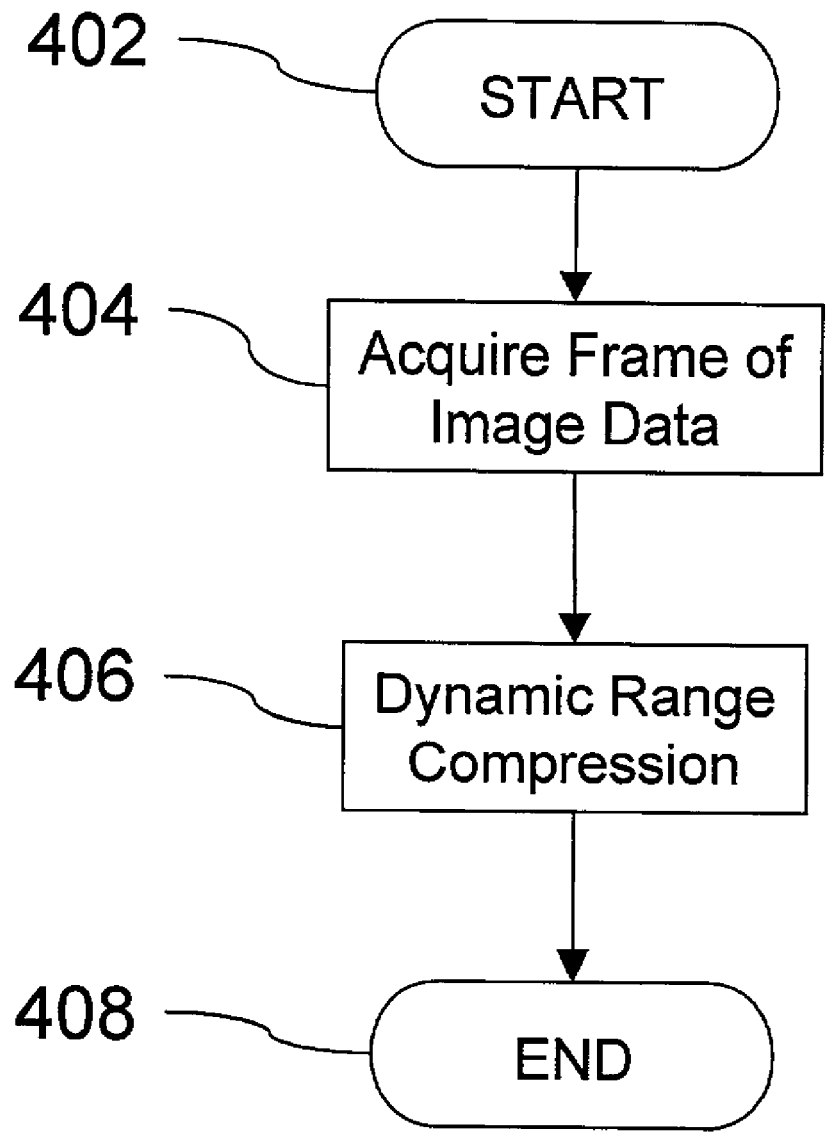
FIG. 4 is a block diagram of an approach for processing imagery according to an exemplary aspect of the present invention.

FIG. 4 is a block diagram of an exemplary approach 400 for processing image data beginning at step 402. As indicated at step 404, the approach 400 comprises acquiring a frame of image data from an image-data source, such as image-data source 102'. As noted previously, the image-data source 102' can comprise a detector array 102, and the image data can be acquired and processed in real time. Alternatively, the image-data source 102' can be a storage medium in which frames of image data have already been stored. In addition, as indicated at step 406, the approach 400 also comprises compressing the dynamic range of image data using a DRC algorithm that utilizes down-sampling, median filtering, and up-sampling. Compressing the dynamic range can remove low-frequency gradient data from the image data.

The term "low-frequency" noted above refers to spatial frequencies characterized, for example, in terms of intensity (contrast) variations as a function of pixel distance or as a function of percentage of a dimension of the field of view for a given image. For example, a ground-to-sky background gradient observed with a WFOV FLIR pilotage system can exhibit an approximately monotonically increasing intensity variation from a low intensity level corresponding to the ground to a high intensity level corresponding to the sky over a vertical span, for example, of 480 pixels (e.g., the vertical field of view). Such a ground-to-sky intensity variation is a non-limiting example of a low-frequency gradient. More generally, intensity gradients that are monotonically varying over a pixel distance corresponding to approximately 20–100% of a field-of-view dimension can be considered low-frequency gradients which can be removed by a DRC algorithm according to the present invention, such as the DRC algorithm described below.

In view of the above, it will be noted that the meaning of low-frequency gradients is accordingly not restricted to gradients pertaining to either a WFOV or a narrow field of view (NFOV). Indeed, the exemplary DRC algorithm described below can be beneficially applied to NFOV image data (e.g., from a targeting system) as well as to WFOV image data. Of course, the benefits of DRC can be particularly beneficial for WFOV image data, which may be more likely to contain significant low-frequency background gradients (e.g., a sky-to-ground gradient). A more detailed exemplary approach for processing image data consistent with approach 400 will now be described with reference to FIG. 5.

Figure 5:
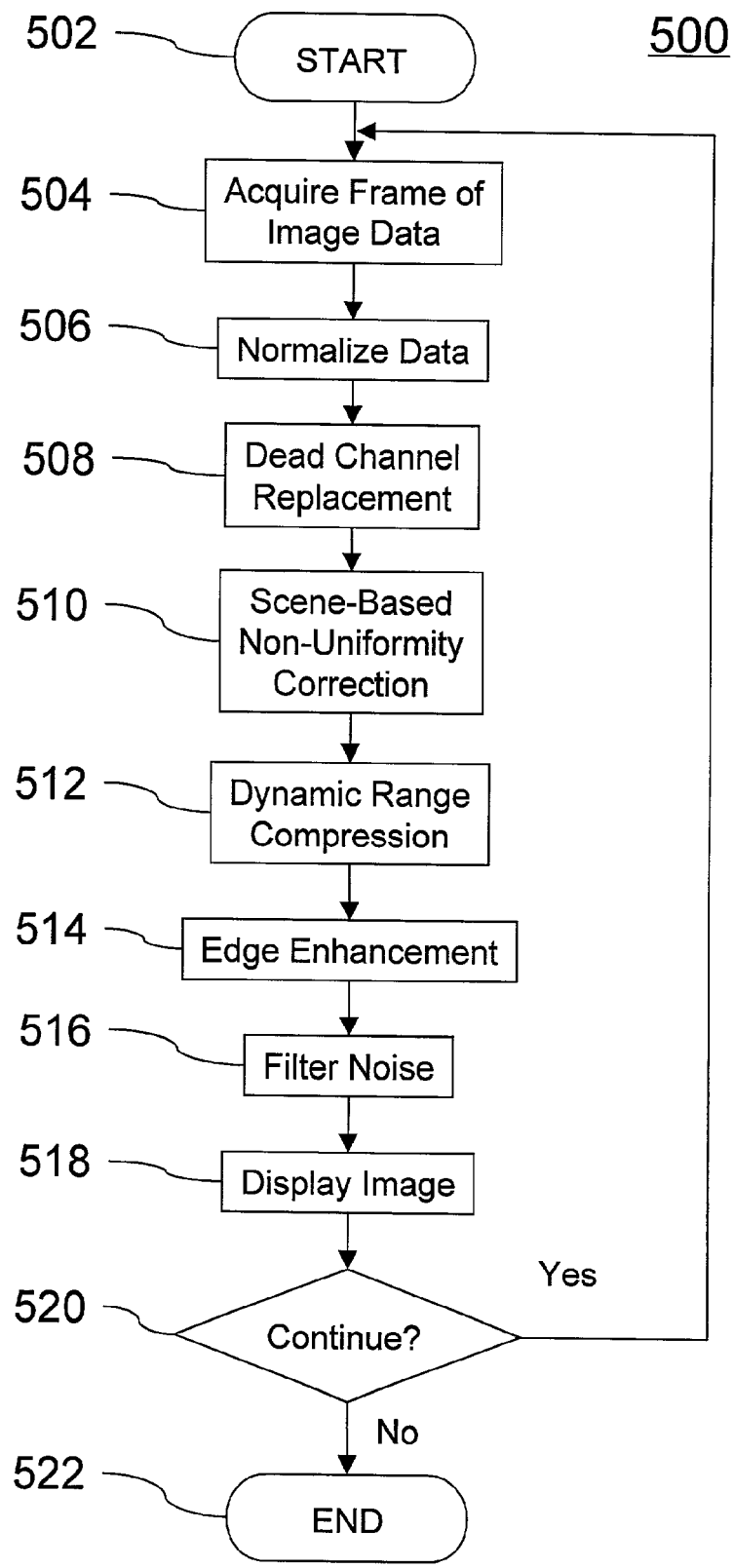
FIG. 5 is a block diagram of an approach for processing imagery according to an exemplary aspect of the present invention.

FIG. 5 is a block diagram of an exemplary approach 500 for processing image data beginning at step 502. As indicated at step 504, the approach 500 comprises acquiring a frame of image data, such as noted above. As indicated at step 506 in the Example of FIG. 5, the approach 500 can optionally further comprise normalizing the frame of image data to generate image data that can be referred to, for example, as second image data or normalized data. This step can be beneficial because image data output from detector arrays utilized in FLIR camera systems, for example, is not expected to be automatically normalized. In an exemplary aspect of the invention, the normalization can comprise correcting the frame of image data using a set of correction coefficients corresponding to detector elements of a detector array used to collect the frame of image data. For example, such correction coefficients can be moment, gain and level coefficients determined for the detector array 102 through a factory calibration using known thermal reference sources. The correction coefficients can additionally be those that have been updated using a power-up correction to the gain and/or level coefficients. Such exemplary corrections are described in the above-incorporated U.S. Patent Application "Scene-Based Non-Uniformity Correction For Detector Arrays", Ser. No. 09/840,920.

In addition, as noted at step 508, in the example of FIG. 5, the approach 500 can also optionally comprise applying a dead-channel-replacement correction to generate image data that can be referred to, for example, as third image data or dead-channel-corrected data. The procedure for dead-channel replacement is known in the art, and is described, for example, in the above-incorporated U.S. patent application Ser. No. 09/463,410 and also in the above-incorporated U.S. Patent Application "Extended Range Image Processing For Electro-Optical Systems", Ser. No. 09/841,079.

In addition, as noted at step 510 in the example of FIG. 5, the approach 500 can also optionally comprise applying a scene-based non-uniformity correction (SBNUC) to the third image data to generate fourth image data (e.g., SBNUC-corrected data). An exemplary SBNUC routine applicable to scanning detector arrays is described in the above-incorporated U.S. Patent Application "Scene-Based Non-Uniformity Correction For Detector Arrays", Ser. No. 09/840,920. Other SBNUC methods applicable to two-dimensional detector arrays are described, for example, in U.S. Pat. No. 5,721,427 "Scene-Based Nonuniformity Correction Processor Incorporating Motion Triggering", U.S. Pat. No. 5,925,880 "Non Uniformity Compensation for Infrared Detector Arrays", U.S. Pat. No. 5,903,659 "Adaptive Non-Uniformity Compensation Algorithm", and U.S. Pat. No. 6,018,162 "System With Motion Detection Scene-Based Non-Uniformity Correction", the disclosures of which are hereby incorporated by reference in their entirety.

As indicated at step 512, the approach 500 further comprises compressing the dynamic range of image data using a DRC algorithm that utilizes down-sampling, median filtering, and up-sampling. Compressing the dynamic range can remove low-frequency gradient data from the image data. The image data processed by the DRC algorithm can be either the frame of image data noted above if the optional steps described above are not carried out or the fourth image data (for example) if optional steps described above are carried out. The output data from the DRC algorithm can be referred to, for example, as DRC-corrected data (or as fifth image data, for example, if the optional steps noted above are carried out). As noted above, the image data can be acquired and processed in real time or can stored in a storage medium and processed from the storage medium. Compressing the dynamic range can remove low-frequency gradient data from the image data. An exemplary DRC algorithm that can be used will be described below.

As indicated at step 514 in the example of FIG. 5, the approach 500 can also optionally comprise applying edge-enhancement (e.g., two-dimensional edge enhancement) to generate image data that can be referred to, for example, as sixth image data or edge-enhanced data. Edge-enhancement filtering can further improve image quality by further reducing low-frequency and middle-frequency components of the image data. The term "middle-frequency" refers to intensity gradients that are monotonically varying over a pixel distance corresponding to approximately 2–20% of a field-of-view dimension.

In an exemplary aspect of the invention, applying edge-enhancement can comprise blurring input image data (i.e., image data provided at the step of edge-enhancement) and subtracting the blurred image data that has been scaled from the input image data. In particular, blurring the input image data can comprise applying a first edge filter (e.g., first box filter) to the input image data, thereby generating first blurred data, multiplying the first blurred data by a first predetermined scale factor, and subtracting the resulting first scaled data from the input image data to provide first edge-filtered data. Blurring the input image data can further comprise applying a second edge filter (e.g., second box filter) to the first edge-filtered data to provide second blurred data, multiplying the second blurred data by a second predetermined scale factor, and subtracting the resulting second scaled data from the first edge-filtered data to provide second edge-filtered data reflecting the edge-enhancement. The first kernel coefficients for the first edge filter and second kernel coefficients for the second edge filter can be configured to approximate a resultant gaussian function. The values of the first and second predetermined scale factors affect the amount of edge-enhancement that is produced. Values of the first and second predetermined scale factors of 0.9 and 0.3, respectively, have been used, but the first and second predetermined scale factors are not limited to these values. Different kernel sizes can be utilized to perform edge enhancement at the a desired spatial frequency. The use of multiple kernels allows for a better approximation of the low frequency removal. Appropriate kernel sizes for the first and second edge filters can be chosen, for example, by measuring the size of the blur spot associated with the detector array and choosing appropriate kernel sizes to substantially remove that blur spot. The concept of a blur spot is well known to those skilled in the art and can be understood as the finite size (e.g., in pixels) of a point source imaged on the detector array.

For example, an exemplary first edge filter comprising a 3×3 kernel of first kernel coefficients and an exemplary second edge filter comprising a 3×5 kernel of second kernel coefficients applicable for two-to-one over-sampled image data, such as noted previously, are illustrated in FIGS. 6A and 6B, respectively. It should be noted that the aspect of repeated kernel coefficients (−0.1 and −0.06 in this example) provide for efficient hardware implementation. Cascading the first and second exemplary edge filters provides the same filtering result as the effective resultant edge filter with a 5×7 kernel illustrated in FIG. 6C. Moreover, the values of the kernel coefficients for the effective resultant 5×7 edge filter can be obtained from the convolution of the first and second edge filters. Carrying out such calculations is well known in the art and does not require further discussion.

It should be noted that implementing edge-enhancement filtering by cascading first and second edge filters having at least some repeated kernel coefficients, such as the exemplary first and second edge filters illustrated in FIGS. 6A and 6B, is considerably more efficient computationally than carrying out a single filtering operation using a corresponding resultant edge filter, such as that illustrated in FIG. 6C. Moreover, it will be understood that the exemplary first and second edge filters shown in FIGS. 6A and 6B can provide for removing low frequency gradient data with spatial frequencies in the range of approximately 20–100% of a field-of-view dimension from the input image data in view of the discussion above. Of course, other kernel sizes can be used to filter different spatial frequencies as noted above.

The exemplary first and second edge filters illustrate in FIGS. 6A and 6B can provide for removal of approximately ninety percent of the intensity of the input image data. If applied separately, there is essentially no falloff at the edges of corresponding filtered data; however, when the first and second exemplary edge filters are cascaded, the resulting edge falloff is nearly ideal in approximating a gaussian function. It should be noted that applying cascaded first and second edge filters to edge pixels of the input image data can be accomplished by mirroring the pixels adjacent to the edge pixels as is well known in the art. An example of such mirroring will be described in detail below with regard to the implementation of an exemplary DRC algorithm.

Whereas the exemplary first and second edge filters illustrated in FIGS. 6A and 6B are configured for two-to-one over-sampled image data (e.g., such as can be obtained with a scanning detector array), the approach of cascading first and second edge filters can also be applied to input image data that is not over-sampled, such as can be obtained with typical staring two-dimensional imaging systems employing two-dimensional focal plane array detectors. In this case, the kernels for the first and second edge filters can both be square. For example, both the first and second edge filters can have 3×3 kernel sizes. In addition, other kernel sizes can be chosen to filter different frequencies as desired as noted above.

Returning to FIG. 5, as indicated at step 516 in the example of FIG. 5, the approach 500 can also optionally comprise applying noise filtering to generate image data that can be referred to, for example, as seventh image data or noise-filtered data. Noise filtering can entail local area averaging in order to reduce the noise in an image and can carried out, for example, using conventional line and column averaging known to those skilled in the art.

With regard to noise filtering, it will be understood that imaging systems can have a blur spot, such as noted above, and images gathered with such systems are expected to have a given blur. Due to the nature of this blur, image information corresponding to one pixel can be highly correlated to image information corresponding to the neighboring pixels. In view of this phenomenon, a simple 1×2 averaging filter can be applied to a frame of image data for which noise filtering is desired. Although such averaging can reduce the perceived resolution of the corresponding image, such averaging can greatly enhance the aesthetic quality of the image by substantially removing the noise component as well. Such a trade-off between image resolution and image noise will be appreciated by those skilled in the art. Moreover, it should noted that image data obtained using horizontal over-sampling such as described above (e.g., two-to-one over-sampling) can provide a benefit wherein there is substantially no discernable resolution loss when the column averaging is carried out.

As indicated at step 518, an image corresponding to image data processed as described above can then be displayed on a display device, such as display 116 illustrated in FIG. 1. Moreover, as indicated at step 520, this process can be repeated interatively on successive frames of image data as desired. The decision at step 520 can be, for example, a decision as to whether the power to the apparatus remains on.

An exemplary approach 700 for dynamic range compression of image data beginning at step 702 will now be described with reference to FIG. 7. As indicated at step 704, the approach 700 comprises down-sampling a frame of image data comprising a first array of pixels to generate a second array of pixels (e.g., an array of super-pixels). The second array of pixels can also be referred to as a super-pixel image map. The frame of image data referred to here is that which is provided as input to the DRC algorithm. Down-sampling is well known in the art and can be carried out by averaging the pixel values of the frame of image data in a down-sampling kernel and providing the resulting value to the corresponding pixel of the second array of pixels (e.g., the array of super-pixels).

For exemplary two-to-one over-sampled data corresponding to an image size of 480×1716 pixels, Applicants have utilized rectangular down-sampling kernel sizes of 4×8, 8×16, and 16×32 (other kernel sizes, such as 2×4 could also be used). In the case of a 16×32 kernel, an appropriate image size can be 480×1728, for example, to provide for an integral division of the image size. The dimension of 1728 pixels can then be modified back to 1716 pixels, for example, if desired. It will be understood that the choice of the down-sampling kernel size affects the spatial frequency of the gradient data ultimately removed from frame of image data using the DRC algorithm. This will be described in more detail below in conjunction with the discussion pertaining to the application of a first median filter (e.g., a large-area median filter) to be applied the second array of pixels (e.g., array of super-pixels). It will also be understood that if conventionally sampled data rather than two-to-one over-sampled image data is acquired, then square down-sampling kernels can be utilized. Moreover, it should also be noted that an appropriate kernel size for a square down-sampling filter can also be chosen in view of the desired spatial frequency of gradient data to be removed from the frame of image data, as will be described below.

As indicated at step 706, the approach 700 further comprises applying a first median filter to the second array of pixels (super-pixels) to generate a blurred array of pixels. The first median filter can be a large-area median filter (LAMF). The term "large-area" in this example refers to the aspect that first median filter can be applied to an array of super-pixels. In addition, the LAMF can have a kernel size of N=L+M elements, wherein L elements are active elements and M elements are inactive elements. Active elements refer to those elements of the LAMF that are utilized in calculating the median value of image pixels to which the first median filter is applied, and inactive elements refer to those elements that are not utilized in calculating the median value. Such a LAMF can be referred to as a sparse LAMF.

Figure 8A:
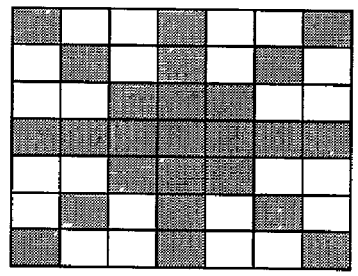
FIG. 8A is a graphical illustration of an exemplary large-area median filter (LAMF) that can be used with a DRC algorithm according to an aspect the present invention.
Figure 8B:
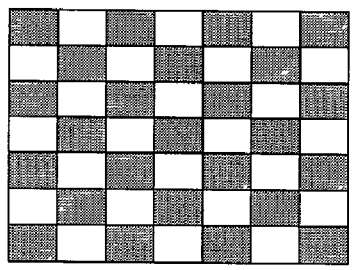
FIG. 8B is a graphical illustration of another exemplary LAMF that can be used with a DRC algorithm according to an aspect the present invention.
Figure 8C:
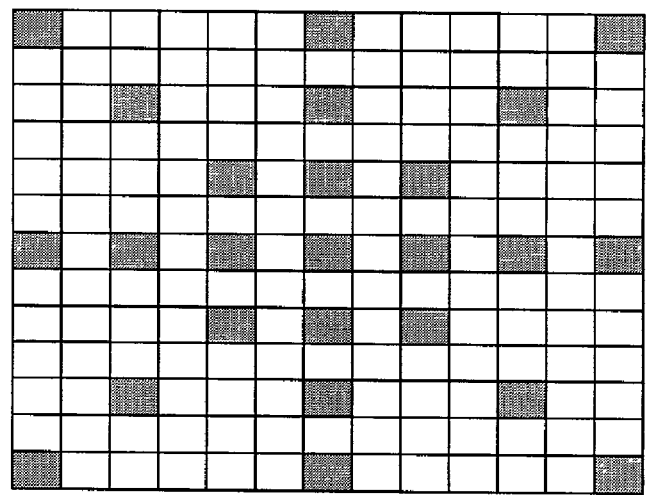
FIG. 8C is a graphical illustration of another exemplary large-area median filter (LAMF) that can be used with a DRC algorithm according to an aspect the present invention.

Exemplary LAMFs with 7×7 kernel sizes and having active elements arranged in predetermined patterns are illustrated in FIGS. 8A and 8B. A 7×7 kernel size has been used, for example, with a 16×32 down-sampling filter, providing an effective area of 112×224 pixels over which the LAMF is applied. According to one exemplary aspect of the present invention, the predetermined pattern can be configured as a star-shaped pattern, such as illustrated in FIG. 8A. Alternatively, the predetermined pattern can be configured as a checkerboard pattern, such as illustrated in FIG. 8B. In addition, various other patterns can also be utilized, and the patterns shown in FIGS. 8A and 8B are not intended to be restrictive. In each of these exemplary patterns, the number of active elements is 25, whereas the total number of elements in the kernel is 49. It should be noted that where computational efficiency is not of primary importance, it can be advantageous to apply a LAMF where all elements of the kernel are active elements. However, where it is important to consider hardware constraints and the associated effects on computational efficiency, it can be advantageous to utilize sparse LAMFs, such as those illustrated in FIGS. 8A and 8B. Other kernel sizes for the LAMF can also be used. For example, a kernel size of 13×13 has been used with a 8×16 down-sampling filter, providing an effective area of 104×208 pixels over which the LAMF is applied. An exemplary 13×13 LAMF in a star-shaped pattern is illustrated in FIG. 8C. Of course, checker-board or other patterns could also be utilized.

Figure 9:
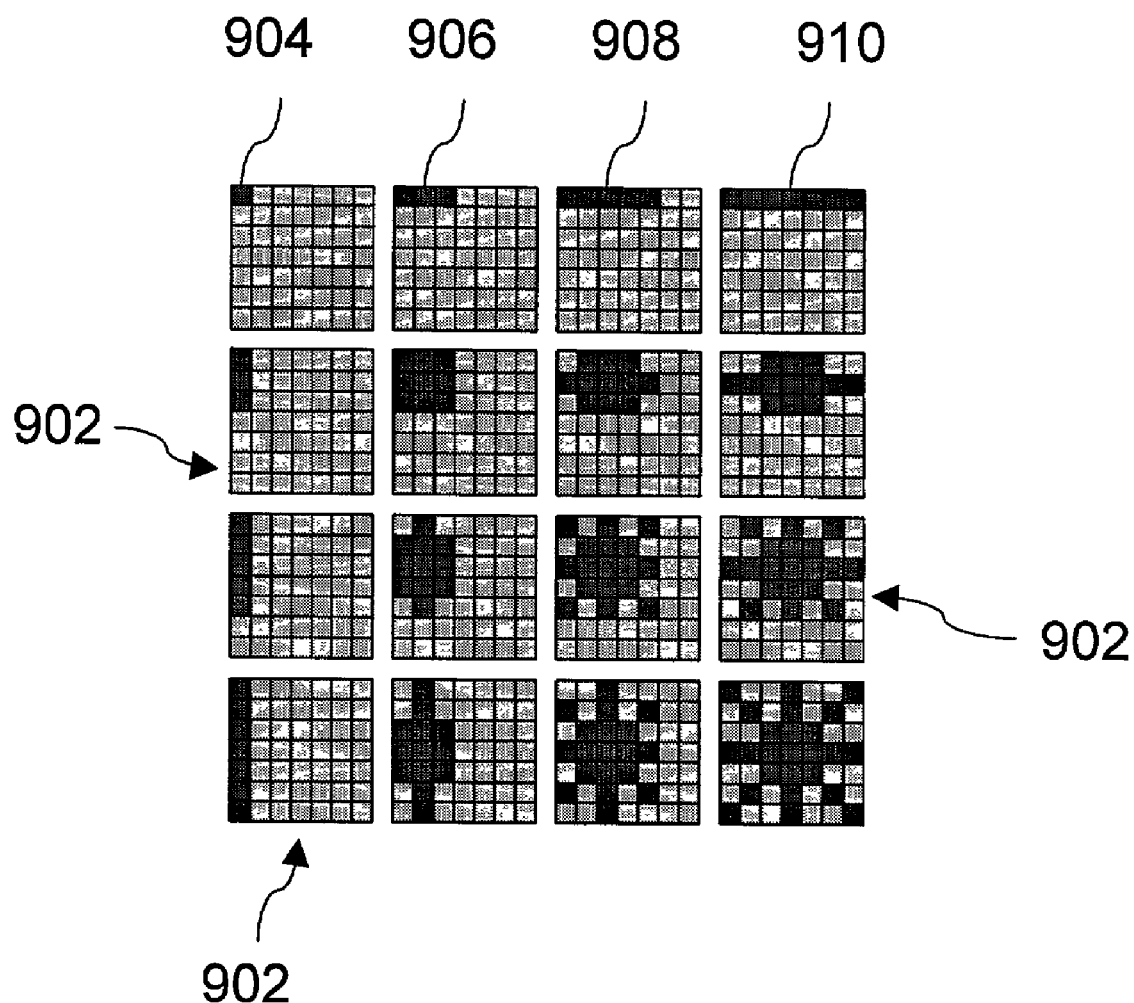
FIG. 9 is a graphical illustration of an exemplary approach for addressing edge effects when applying a LAMF according to an aspect the present invention.

An exemplary approach for applying a sparse LAMF to edge-related pixels will now be described. It will be apparent that the 7×7 LAMF illustrated in FIG. 8A cannot be applied exactly as illustrated in FIG. 8A to pixels within three pixels of any edge in the second array of pixels. Accordingly, FIG. 9 graphically illustrates an exemplary approach 900 for applying a sparse LAMF to an upper-left-most square of sixteen pixels of the second array of pixels. In FIG. 9, the upper-left-most square of forty-nine pixels 902 is shown sixteen times, once corresponding to an exemplary treatment of each of the noted sixteen pixels. It will be recognized that fifteen of these sixteen pixels can be considered edge-related pixels; the central pixel of the bottom-right-most diagram is not an edge related pixel. It should be understood that the entire second array of pixels (super-pixels) is not illustrated in FIG. 9.

Application of the above-noted approach to exemplary pixels will now be described. First, the median value of corner pixel 904 can be provided by using the value of that pixel. In addition, the median value of pixel 906 can be provided by calculating the median value of the indicated three shaded pixels—pixel 906 and the two adjacent shaded pixels. Further, the median value of pixel 908 can be provided by calculating the median value of the five indicated shaded pixels—pixel 908 and the adjacent pairs of shaded pixels. Moreover, the median value of pixel 910 can be provided by calculating the median value of the seven indicated shaded pixels—pixel 910 and the adjacent triplets of shaded pixels. Median values of the remaining pixels of the noted fifteen edge-related pixels, which occur at the centers of the respective indicated shaded patterns, can be provided by calculating the median values corresponding shaded pixels of those patterns. The median value of the central pixel (not an edge-related pixel) of the bottom-right-most diagram can be provided by applying the LAMF in the manner that the LAMF is illustrated FIG. 8A. This approach can be repeated as appropriate for all edge-related pixels for the entire second array of pixels.

It should be noted that the kernel size of the down-sampling filter and the kernel size of the first median filter (e.g., a LAMF) both affect the spatial frequency of the gradient data to removed from the frame of image data input to the DRC algorithm. In particular, as noted above, these two steps can be viewed as applying a median filter to an array of down-sampled super-pixels. Accordingly, appropriate sizes for these kernels can be chosen to remove gradient data of a desired spatial frequency by identifying an image dimension corresponding to the desired low-frequency gradient data to be removed (e.g., a dimension corresponding to N×M pixels), and multiplying the kernel sizes as described above to provide an effective area over which the LAMF is applied that approximates the above-noted image dimension.

It should be noted that the first median filter can have a square kernel regardless of whether the frame of image data is conventionally sampled or two-to-one over-sampled. This is because a down-sampling filter with a rectangular kernel, such as described above, will generate a square second array of pixels (super-pixels) when applied to two-to-one over-sampled data. Thus, the first median filter can have a square kernel in this instance as well as for conventionally sampled image data. It will be understood, however, that the kernel sizes of the down-sampling filter and first median filter (e.g., LAMF) should be chosen such that the down-sampling results in an integer number of super-pixels in the second array of pixels.

For two-to-one over-sampled image data with a frame size of 480×1728 pixels, Applicants have found that a 16×32 down-sampling kernel used in conjunction with a 7×7 large-area median filter (LAMF) is advantageous for providing superior image quality of resultant DRC-corrected images. However, using an exemplary hardware configuration comprising a single circuit card assembly (CCA) with a SEMD (standard electronics module of type D) form factor and having two one-million-gate FPGA devices, it was found that a down-sampling kernel size of 8×16 provided the best trade-off between image quality and processing efficiency. Of course, the above-noted kernel sizes and image-frame sizes are exemplary and are not intended to be restrictive in any way.

Figure 7:
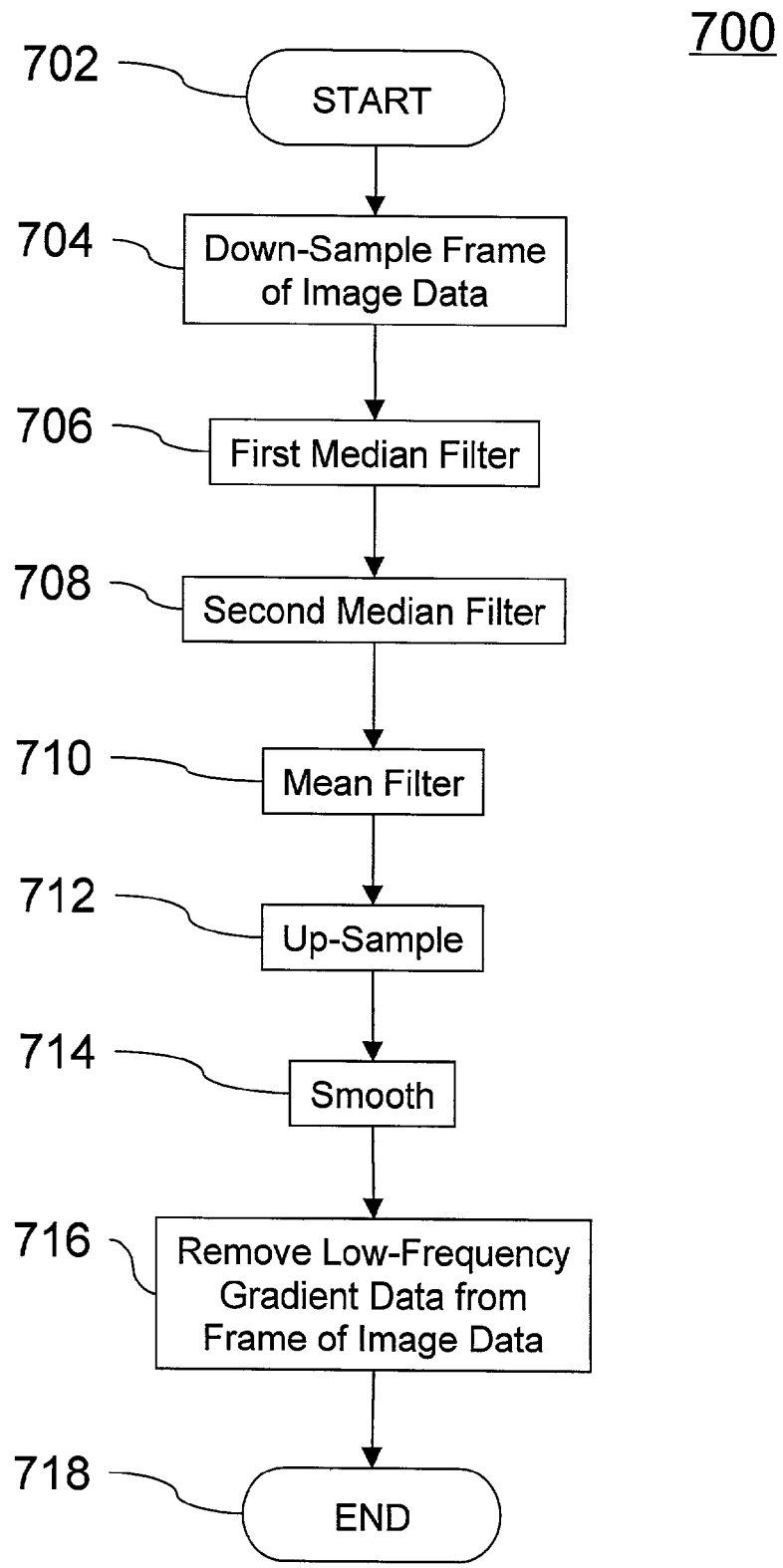
FIG. 7 is a block diagram illustrating a dynamic range compression (DRC) algorithm according to an exemplary aspect of the present invention.

As indicated at step 708 in the example of FIG. 7, the approach 700 can also optionally comprise applying a second median filter having a smaller kernel than the first median filter. Application of a second median filter can further smooth the output from the first median filter by removing "hot spots" in image data that are left when the first median filter is a sparse LAMF. In an exemplary aspect of the present invention, a second median filter having a 3×3 kernel can be applied. This exemplary 3×3 second median filter can be applied by calculating the median value of nine appropriate pixels corresponding to the 3×3 kernel. An appropriate kernel size for the second median filter can be chosen by noting the sizes of the gaps in a sparse LAMF and by choosing a relatively small kernel size for the second median filter such that the second median filter is still able to remove the above-noted hot spots. It can be beneficial to choose a relatively small kernel size for the second median filter to minimize "column delay" in the processing of image data. In other words, an appropriate number of columns of image data can be buffered in a memory (column delay) to provide for the application of various process steps, such as noted above; smaller kernel sizes for the second median filter can provide for smaller column delay.

Figures 10, 11, 12:
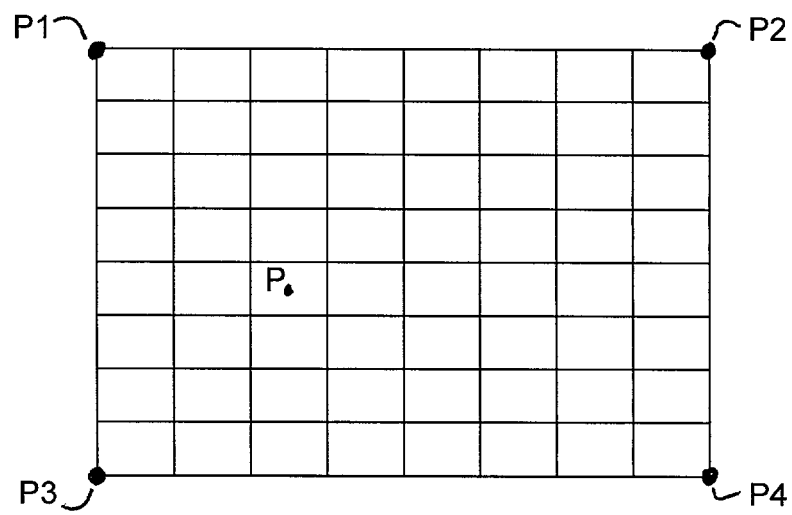
FIG. 10 is a graphical illustration of an exemplary approach for addressing edge effects when applying a conventional median filter according to an aspect the present invention.
FIG. 11 is a graphical illustration of a pixel configuration for applying bilinear interpolation (BLI) according to an exemplary aspect the present invention.
FIG. 12 is a graphical illustration of an exemplary approach for addressing edge effects when applying BLI according to an aspect the present invention.

Application of the second median filter to edge pixels of the second array of pixels can be accomplished by mirroring pixels about the edge of the second array of pixels. Such mirroring is well known in the art and is illustrated, for example, in FIG. 10. In particular, FIG. 10 illustrates exemplary mirroring for calculating the median value of corner pixel 1 illustrated therein. The unshaded pixels in FIG. 10 are true pixels, and the shaded pixels are mirrored pixels. The median value of pixel 1 is given by calculating the median of the nine pixel values illustrated in FIG. 10. Other approaches for addressing edge pixels include replicating pixels (e.g., replicated pixels having the values of adjacent edge pixels are placed outside the edge pixels) and padding with zeros (e.g., replicated pixels having values of zero are placed outside the edge pixels) as known to those skilled in the art.

As indicated at step 710 in the example of FIG. 7, the approach 700 can also optionally comprise applying a mean filter to the output from the second median filter. Application of a mean filter can further smooth output from the second median filter, noting that the second median filter is a non-linear filter. In an exemplary aspect of the present invention, a mean filter with a 3×3 kernel can be used. This exemplary mean filter can be applied by averaging the pixel values of the eight neighboring pixels surrounding a given central pixel. Application of the mean filter to edge pixels can be carried out by mirroring as described above for the second median filter. The output from the mean filter can be referred to as a blurred array of pixels. Alternatively, if the optional steps 708 and 710 are not carried out, then the output from the first median filter can be referred to as the blurred array of pixels. A variety of kernel sizes for the mean filter can be used, and an appropriate kernel size can be chosen in view of the dimension(s) over which any non-linear effects may be expected from the second median filter.

As indicated at step 712, the approach 700 further comprises applying up-sampling to the blurred array of pixels to generate up-sampled data. Up-sampling generates low-frequency gradient data information that can then be removed from the frame of image data input to the DRC algorithm. In an exemplary aspect of the present invention, this up-sampling can comprise applying bilinear interpolation (BLI) and can also be referred to as a BLI zoom. BLI is well known in the art, and exemplary BLI is described in U.S. Pat. No. 5,801,678 "Fast Bi-Linear Interpolation Pipeline", the disclosure of which is hereby incorporated by reference in its entirety, and in above-incorporated U.S. Patent Application "Extended Range Image Processing For Electro-Optical Systems", Ser. No. 09/841,079.

An exemplary BLI approach according to an exemplary aspect of the present invention can be described with reference to FIG. 11. In this exemplary aspect, BLI is based on a linear combination of the four nearest true pixels to an interpolated pixel. In FIG. 11, four true pixels are given by P1, P2, P3 and P4 with locations at the points indicated; an interpolated pixel is given by P with a center location as indicated. The configuration illustrated in FIG. 11 corresponds to an 8×8 up-sampling kernel shown for convenience rather than a 8×16 up-sampling kernel, for example. The following equation (which can be referred to as a BLI function) provides the value for P in terms of P1–P4 according to this exemplary aspect:

$$P=P1*(1-dx)*(1-dy)+P2*(dx)*(1-dy)+P3*(1-dx)*(dy)+P4*(dx)*(dy).$$

In the above-noted equation, dx and dy are normalized distances from an origin defined as the location of pixel P1. For example, the normalized dx distance between pixel P and pixel P1 is (5 units)/(16 units); that is, the distance is determined with reference to half-pixel units given the corner locations of P1–P4 and the center location of P. In an exemplary aspect of this approach, the values for each of the four multipliers of P1–P4 (as a function of the position of pixel P) can be computed in advance and stored in a look-up table (LUT) to provide for computational efficiency.

With regard to edge pixels, interpolated values of edge pixels can be determined by applying the above-noted equation as provided above. Alternatively, interpolated values of edge pixels can be determined by replicating the last valid pixel beyond the corresponding edge. An exemplary folding technique for accomplishing this task is illustrated in FIG. 12, wherein unshaded pixels are valid pixels, and wherein shaded pixels are replicated pixels. Of course, edge pixels can also be addressed using other approaches, such as mirroring and padding with zeros as noted previously.

As indicated at step 714 in the example of FIG. 7, the approach 700 can also optionally comprise smoothing output from the up-sampling filter, wherein output resulting from the smoothing provides low-frequency gradient data. If this optional step is not carried out, the output resulting from up-sampling at step 712 (up-sampled data) can be considered the low-frequency gradient data. In an exemplary aspect of the present invention, the smoothing can comprise applying a vertical and horizontal finite-impulse-response (FIR) filter.

In an exemplary aspect of the present invention, applying the vertical and horizontal FIR can comprise applying an averaging function. Moreover, applying the vertical and horizontal FIR can help remove any errors introduced by the BLI function. It should be noted that the BLI function has a maximum error at the boundary where the four true pixels used for interpolation are changed. This error arises due to a change in the slope of an interpolating matrix (the collection of above-noted multipliers as a function pixel P position) because different super-pixels are used to interpolate neighboring up-sampled pixels. This error can typically be seen as vertical and horizontal banding that can occur periodically in an image corresponding to the up-sampled data. Applying a vertical and horizontal FIR having an averaging function can minimize such banding.

Figure 13:
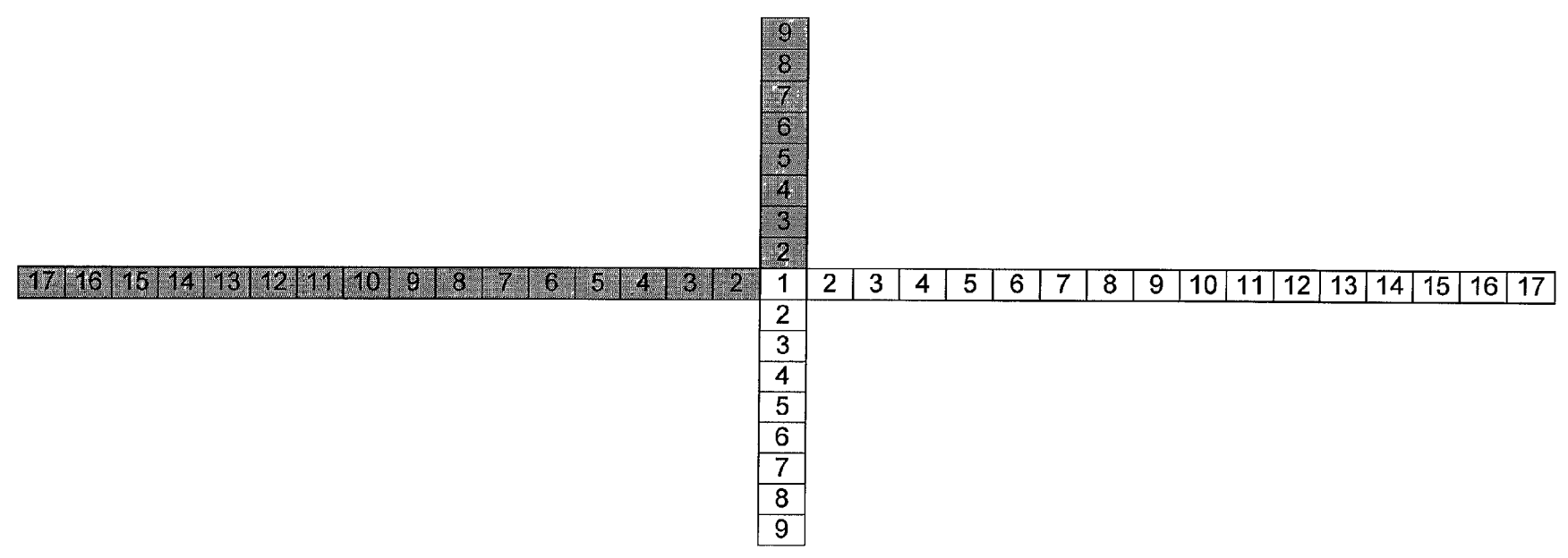

In an exemplary aspect of the present invention, applying a vertical and horizontal FIR having a kernel size with the same aspect ratio as the down-sampling filter can be advantageous. For example, for the exemplary down-sampling kernel sizes noted above, a 16×32 vertical and horizontal FIR can be applied. In this example, the vertical and horizontal FIR can average the eight pixels above, the eight pixels below, the sixteen pixels to the right, and the sixteen pixels to the left of a central pixel in order to generate the new value of the central pixel, thereby smoothing the imagery in the both the vertical and horizontal directions. The vertical and horizontal FIR can be applied to edge pixels using mirroring similar to that described for the second median filter and the mean filter. Exemplary mirroring in this regard is illustrated in FIG. 13 with regard to applying the vertical and horizontal FIR to a corner pixel 1 illustrated therein. Unshaded pixels represent true pixels, and shaded pixels represent mirrored (replicated) pixels. In an exemplary aspect, the value of the central pixel 1 is not utilized in calculating the average value because it is desirable to execute the averaging using a number of pixels that is an integer multiple of 2 for computational efficiency in the hardware.

Returning to FIG. 7, the approach 700 further comprises removing at least a portion of the low-frequency gradient data generated by previous steps from the frame of image data input to the DRC algorithm. In an exemplary aspect of the present invention, this removal can comprise multiplying the low-frequency gradient data by a scale factor and subtracting the scaled data from the frame of image data input to the DRC algorithm. In an exemplary aspect of the present invention, the scale factor can range from approximately 0.5 to −0.95. A nominal value of 0.8 can typically be used. The output thereby generated provides DRC-corrected image data. An appropriate scale factor can be determined at the engineering level by applying the approach 700 to test imagery using a range of scale factors and then making a selection based upon the aesthetic quality of resulting DRC-corrected images.

The present invention as described above can provide advantageous DRC and enhancement of imagery, thereby allowing fine detail to be observed in imagery initially corrupted with low-frequency gradient data that could otherwise significantly or entirely obscure the fine detail.

In another aspect of the present invention, as discussed above with regard to step 514 of FIG. 5 (pertaining to edge enhancement), there is provided an approach for approximating a gaussian-blur filter comprising applying a first box filter having a first kernel size to a group of pixels of a frame of image data, and applying a second box filter having a second kernel size to the group of pixels, wherein first kernel coefficients for the first box filter and second kernel coefficients for the second box filter are configured to approximate a resultant gaussian function. In an exemplary aspect, the second kernel size is greater than or equal to the first kernel size. Moreover, the first kernel size of the first box filter can symmetric, such as the 3×3 kernel illustrated in FIG. 6A, and the second kernel size of the second box filter can be asymmetric, such as illustrated in FIG. 6B, for example, when the frame of image data is two-to-one over-sampled as described above. Alternatively, the first kernel size of the first box filter and the second kernel size of the second box filter can both be symmetric, for example, when the frame of image data is not over-sampled as described above.

The invention has been described with reference to particular embodiments. However, it will be readily apparent to those skilled in the art that it is possible to embody the invention in specific forms other than those of the embodiments described above. This can be done without departing from the spirit of the invention. The embodiments described herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing image data, the method comprising the steps of:
    acquiring a frame of image data;
    correcting the frame of image data using a set of correction coefficients corresponding to detector elements of a detector array used to collect the frame of image data; and
    compressing a dynamic range of the frame of image data using a dynamic range compression algorithm that utilizes down-sampling, median filtering, and up-sampling.

2. The method of claim 1, wherein the correcting step normalizes the frame of image data prior to the step of compressing the dynamic range.

3. The method according to claim 1, wherein the down-sampling, median filtering, and up-sampling are applied in that order.

4. The method of claim 2, further comprising the step of:
    applying a dead-channel-replacement correction after the step of normalizing the frame of image data.

5. The method of claim 4, further comprising the step of:
    applying a scene-based non-uniformity correction after the step of applying the dead-channel-replacement correction.

6. The method of claim 5, further comprising the step of:
    applying edge-enhancement after the step of compressing the dynamic range.

7. The method of claim 6, wherein applying edge-enhancement comprises the steps of:
    blurring input image data;
    subtracting blurred input image data from the input image data.

8. The method of claim 7, wherein blurring input image data comprises:
    applying a first edge filter to the input image data, thereby generating first-edge-filtered data; and
    applying a second edge filter to the first-edge-filtered data, wherein first kernel coefficients of the first edge filter and second kernel coefficients of the second edge filter are configured to approximate a resultant gaussian function.

9. The method of claim 6, further comprising the step of:
    applying noise filtering after the step of applying edge-enhancement.

10. The method of claim 9, further comprising the step of:
    displaying an image corresponding to the frame of image data after the step of applying noise filtering.

11. A method of dynamic range compression of image data, the method comprising the steps of:
    down-sampling a frame of image data comprising a first array of pixels to generate a second array of pixels;
    applying a first median filter to the second array of pixels to generate a blurred array of pixels;
    up-sampling the blurred array of pixels; and removing at least a portion of low-frequency gradient data generated by previous steps from the frame of image data.

12. The method of claim 11, wherein said up-sampling comprises applying bilinear interpolation.

13. The method of claim 11, wherein the first median filter is a large-area median filter.

14. The method of claim 13, wherein the large-area median filter has a kernel of N=L+M elements, wherein L elements are active elements and M elements are non-active elements.

15. The method of claim 14, wherein the active elements are arranged in a predetermined pattern.

16. The method of claim 15, wherein the predetermined pattern is configured as a star-shaped pattern.

17. The method of claim 15, wherein the predetermined pattern is configured as a checkerboard pattern.

18. The method of claim 11, further comprising the step of:
applying a second median filter after applying the first median filter, the second median filter having a smaller kernel than the first median filter.

19. The method of claim 18, further comprising the step of:
applying a mean filter after applying the second the median filter.

20. The method of claim 19, further comprising the step of:
smoothing output data from the up-sampling, wherein output data from said smoothing provides the low-frequency gradient data.

21. The method of claim 20, wherein said smoothing comprises:
applying a vertical and horizontal finite-impulse-response (FIR) filter.

22. A computer-readable medium adapted to cause a processor to execute the method of claim 1.

23. A computer-readable medium adapted to cause a processor to execute the method of claim 11.

24. The method of claim 1, wherein said median filtering comprises applying a median filter to down-sampled image data, the median filter having a kernel of N=L+M elements, wherein L elements are active elements and M elements are non-active elements, the active elements being arranged in a predetermined pattern.

25. A computer-readable medium adapted to a cause a processor to execute the method of claim 24.

26. An apparatus for processing image data, comprising:
an image-data source; and
a processor unit coupled to the image-data source, the processor unit being configured to correct a frame of image data using a set of correction coefficients corresponding to detector elements of a detector array used to collect the frame of image data, and compress a dynamic range of the frame of image data using a low-frequency-suppression algorithm that uses down-sampling, median filtering, and up-sampling.

27. An apparatus for dynamic range compression of image data, comprising:
a processor unit coupled to an image-data source, the processor unit being configured to:
down-sample a frame of image data comprising a first array of pixels to generate a second array of pixels;
apply a first median filter to the second array of pixels to generate a blurred array of pixels;
up-sample the blurred array of pixels; and
remove at least a portion of low-frequency gradient data thereby generated by the processor unit from the frame of image data.

28. The apparatus according to claim 26, wherein the down-sampling, median filtering, and up-sampling are applied in that order.

29. An apparatus for processing image data, comprising:
a memory; and
a processor coupled to the memory, the processor being configured to execute the method of claim 1.

30. An apparatus for processing image data, comprising:
a memory; and
a processor coupled to the memory, the processor being configured to execute the method of claim 2.

31. The apparatus of claim 26, wherein said median filtering comprises applying a median filter to down-sampled image data, the median filter having a kernel of N=L+M elements, wherein L elements are active elements and M elements are non-active elements, the active elements being arranged in a predetermined pattern.

32. An apparatus for processing image data, comprising:
a memory; and
a processor coupled to the memory, the processor being configured to execute the method of claim 4.

33. An apparatus for processing image data, comprising:
a memory; and
a processor coupled to the memory, the processor being configured to execute the method of claim 5.

34. An apparatus for processing image data, comprising:
a memory; and
a processor coupled to the memory, the processor being configured to execute the method of claim 6.

35. An apparatus for processing image data, comprising:
a memory; and
a processor coupled to the memory, the processor being configured to execute the method of claim 7.

36. An apparatus for processing image data, comprising:
a memory; and
a processor coupled to the memory, the processor being configured to execute the method of claim 8.

37. An apparatus for processing image data, comprising:
a memory; and
a processor coupled to the memory, the processor being configured to execute the method of claim 9.

38. An apparatus for processing image data, comprising:
a memory; and
a processor coupled to the memory, the processor being configured to cooperate with a display to execute the method of claim 10.

39. An apparatus for processing image data, comprising:
a memory; and
a processor coupled to the memory, the processor being configured to execute the method of claim 11.

40. An apparatus for processing image data, comprising:
a memory; and
a processor coupled to the memory, the processor being configured to execute the method of claim 12.

41. An apparatus for processing image data, comprising:
a memory; and
a processor coupled to the memory, the processor being configured to execute the method of claim 13.

42. An apparatus for processing image data, comprising:
a memory; and
a processor coupled to the memory, the processor being configured to execute the method of claim 14.

43. An apparatus for processing image data, comprising:
a memory; and
a processor coupled to the memory, the processor being configured to execute the method of claim 15.

44. An apparatus for processing image data, comprising:
a memory; and
a processor coupled to the memory, the processor being configured to execute the method of claim 16.

45. An apparatus for processing image data, comprising:
a memory; and
a processor coupled to the memory, the processor being configured to execute the method of claim 17.

46. An apparatus for processing image data, comprising:
a memory; and
a processor coupled to the memory, the processor being configured to execute the method of claim 18.

47. An apparatus for processing image data, comprising:
a memory; and
a processor coupled to the memory, the processor being configured to execute the method of claim 19.

48. An apparatus for processing image data, comprising:
a memory; and
a processor coupled to the memory, the processor being configured to execute the method of claim 20.

49. An apparatus for processing image data, comprising:
a memory; and
a processor coupled to the memory, the processor being configured to execute the method of claim 21.

50. A computer-readable medium adapted to cause a processor to execute the method of claim 2.

51. A computer-readable medium adapted to cause a processor to execute the method of claim 4.

52. A computer-readable medium adapted to a cause a processor to execute the method of claim 31.

* * * * *